July 8, 1941.    G. LIEBLER    2,248,538
COLLAPSIBLE AUTOMOBILE ROOF
Filed Aug. 26, 1940    2 Sheets-Sheet 1
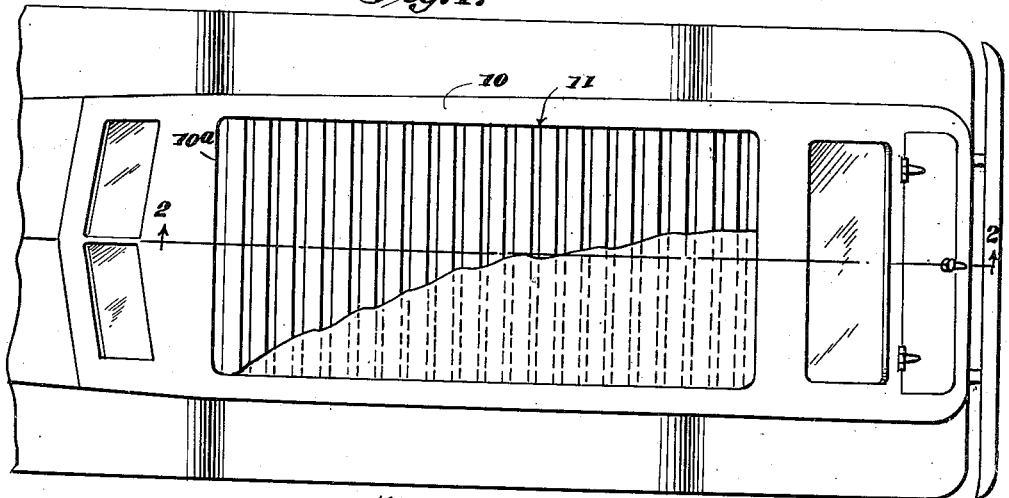
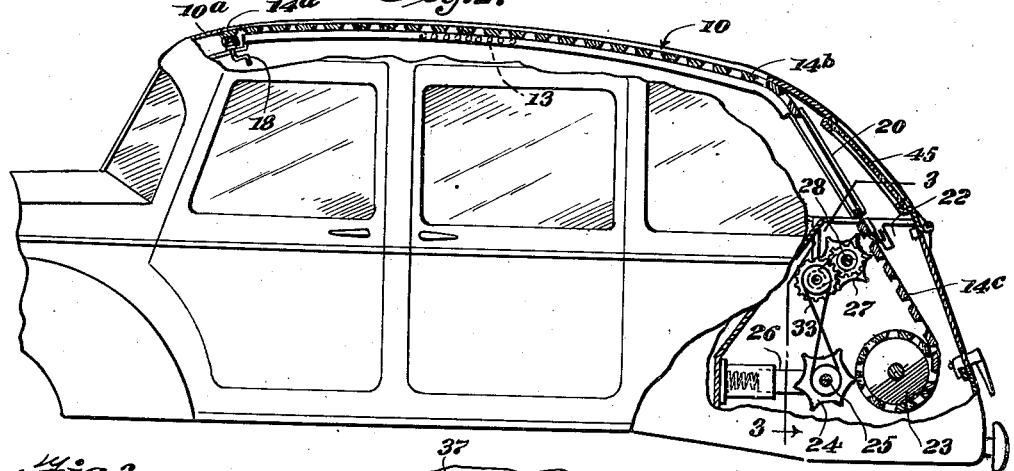
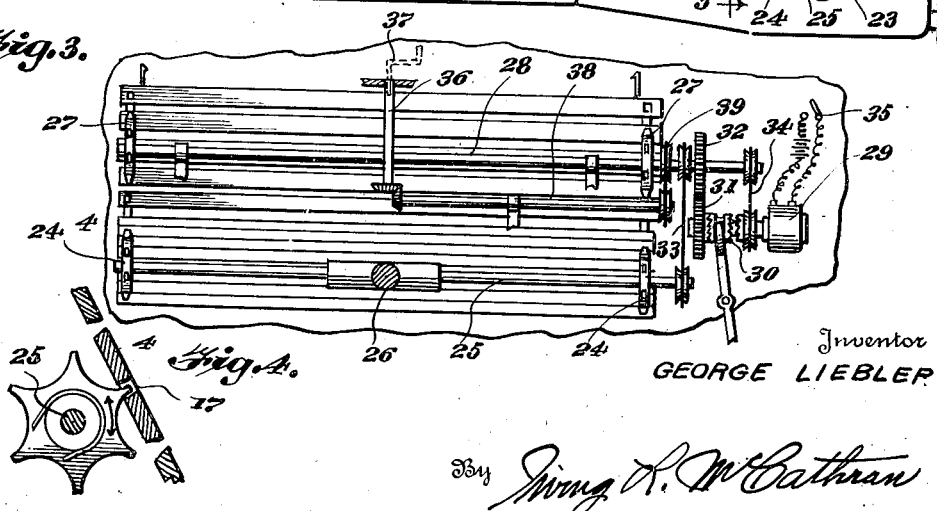
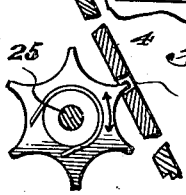
Inventor
GEORGE LIEBLER
By Irving L. McCathran
Attorney

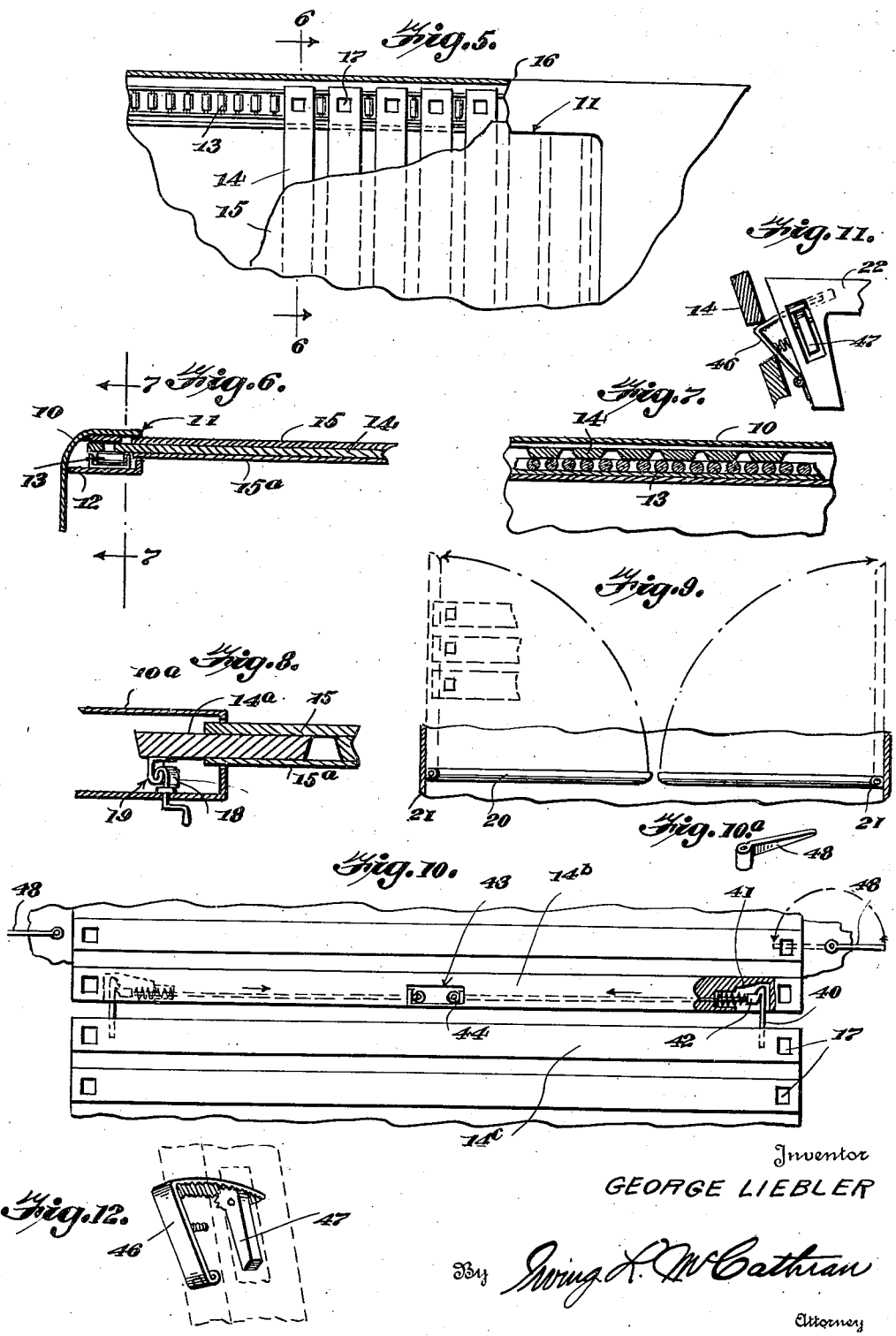

Patented July 8, 1941

2,248,538

UNITED STATES PATENT OFFICE 2,248,538

COLLAPSIBLE AUTOMOBILE ROOF

George Liebler, New York, N. Y.

Application August 26, 1940, Serial No. 354,318

3 Claims. (Cl. 296—98)

This invention relates to a collapsible automobile roof, and has for one of its objects the production of a simple and efficient means for moving the roof to and from a collapsed position.

A further object of this invention is the provision of means whereby a portion of the collapsible roof may be separated from the main portion thereof to allow free vision through the rear window of the automobile upon which the mechanism is carried.

Other objects and advantages of the present invention will appear throughout the following specification and claims.

In the drawings—

Figure 1 is a top plan view, certain parts being broken away;

Figure 2 is a fragmentary side elevational view of the body of an automobile, certain parts being shown in section;

Figure 3 is a sectional view taken on line 3—3 of Figure 2;

Figure 4 is an enlarged sectional view taken on line 4—4 of Figure 3;

Figure 5 is a fragmentary top plan view of a portion of an automobile top, certain parts being shown in horizontal section;

Figure 6 is a sectional view taken on line 6—6 of Figure 5;

Figure 7 is a sectional view taken on line 7—7 of Figure 6;

Figure 8 is an enlarged longitudinal sectional view through the forward portion of the car roof showing the means for locking the collapsible portion in place;

Figure 9 is a vertical sectional view taken through the rear portion of the automobile in front of the hinged roof guides or tracks;

Figure 10 is a fragmentary plan view of the slatted top, showing the means for connecting the sections together;

Figure 10$^a$ is a perspective view of one of the pivoted wedges, shown in Figure 10;

Figure 11 is a side elevational view of the latch for engaging the slats to prevent the slats from dropping below the top of the trunk; and Figure 12 is a perspective view of the latch mechanism.

By referring to the drawings, it will be seen that 10 designates an automobile which is provided with an enlarged opening 11 in the top thereof. A channel 12 is formed under the top adjacent the side edges of the opening 11, as shown in Figure 6, and a plurality of rollers 13 are mounted in this channel 12, as also shown in Figures 5, 6 and 7.

A collapsible top is slidably mounted within the top of the automobile 10, and this collapsible top comprises a plurality of slats 14 extending transversely of the top of the automobile 10 and the slats are adapted to close the opening 11. A suitable fabric or other covering 15 is carried by the slats 14, as shown in Figure 5, the slats preferably projecting beyond the edge 16 of the covering 15, as shown in Figure 5. Each slat 14 is provided wth a notch 17 at the end thereof at a point approximately overhanging the rollers 13 for the purpose hereinafter described. I preferably provide a locking member 18 similar to a window latch at the forward end 10$^a$ of the automobile top which engages a keeper 19 carried by the forward slat 14$^a$. The slats 14 may also be provided with an inner lining 15$^a$, if desired, as shown in Figure 6.

A pair of hinged guide tracks 20 is hingedly secured, as at 21, just above the trunk 22, and these guide tracks are adapted to be thrown up against the sides of the automobile top, as shown in dotted lines in Figure 9, and in full lines in Figure 2, while the top is in a raised position or is being moved to and from a raised position. The collapsible top is adapted to be rolled upon a drum 23 carried within the trunk 22, and when the collapsible top is rolled upon the drum 23 and is entirely encased within the trunk 22, the guide tracks 20 may be thrown down to overlie the slot formed in the top of the trunk 22 through which the collapsible top is adapted to extend.

A pair of spur wheels 24 is carried by a shaft 25, which shaft is supported upon a spring-pressed plunger 26 to normally hold the spur wheels 24 in contact with the ends of the slats 14, the spur wheels having points which fit within the notches 17, as shown in detail in Figure 4. These spur wheels 24 may, therefore, move toward and away from the drum 23, as the slats 14 are rolled upon the drum 23.

A second pair of spur wheels 27 is carried by a drive shaft 28 mounted near the top of the trunk 22 and these spur wheels 27 engage the slats adjacent the top of the trunk to facilitate the movement of the collapsible top to and from an extended position.

I preferably provide a driving motor 29 which drives a clutch wheel 30, which clutch wheel may be moved to engage a lifting gear 31 which meshes with a gear 32 to drive the shaft 28, the shaft 25 being driven by a belt drive 33 from the shaft 28. The shaft 28 may be driven in the opposite direction through the medium of the direct belt drive 34 when the clutch wheel 30 is thrown into clutching engagement therewith. A suitable switch 35 may be provided for closing the circuit to control the operation of the motor 29.

I also provide a manually operating mechanism in the nature of a shaft 36 driven by a removable crank 37 shown in dotted lines in Figure 3, which shaft 36 drives a shaft 38 which in turn drives the shaft 28 through the medium of a belt 39. By means of this structure, the operating mechanism may be either operated manually or electrically. The switch 35 may be placed upon the dashboard or at any other convenient location.

The collapsible top is preferably formed in two sections, one section being indicated as section 14b and the other setcion being indicated as section 14c in Figure 10. The section 14c is provided with a plurality of hook members 40 which are adapted to fit into the notches 41 formed in one of the slats of section 14b to be engaged by the spring-pressed latches 42 to hold the sections 14b and 14c in connected relation. The slat which carries the latches 42 is provided with an opening 43 for receiving the rings 44, which rings may be engaged by an operator to release the latches 42 from the hooks 40 and permit section 14b to be separated from setcion 14c, as is shown in Figure 2, preferably at a point adjacent the rear-view window 45 so as to prevent the vision of the driver of the automobile from becoming obstructed.

In order to prevent section 14c from dropping down into the trunk when the sections 14b and 14c are disconnected, I have provided a spring-pressed latch 46 which may be mounted in any suitable or desired position for engaging the slats adjacent the ends thereof to permit the top to be rolled to a position to close the opening 11 and prevent the top from reeling backward. This latch will also hold section 14c in position and prevent the same from dropping down into the trunk. The latch 46 may be locked in either a closed or an extended position by means of a cam lever 47 as is shown in Figure 12.

Pivoted wedges 48 are mounted adjacent the edges of the collapsible roof and may be swung from the full line position shown in Figure 10 to overlie the edges of the collapsible roof, as shown in dotted lines in Figure 10, thereby clamping the collapsible roof in a set position to prevent vibration. These wedges may be located in any suitable or desired position for properly engaging the roof.

From the foregoing description it should be understood that the collapsible roof comprises the slats 14 which as stated above may be provided with an inner and outer covering and which may be easily rolled to and from an extended position and due to the fact that the collapsible roof is made in two detached sections, the sections may be separated to prevent blocking the vision of the driver of the automobile, thereby permitting him to see through the rear window 45. The two sections may be connected when moving the collapsible roof to and from an extended position.

It will also be understood by considering the foregoing description and drawings, that the collapsible roof may be moved to a position to close the top opening 11, but when it is desired to render the opening 11 free and unobstructed the collapsible roof may be rolled upon the drum 23 within the compartment 22, thereby providing an open top vehicle.

Certain detail changes in the mechanical construction may be made without departing from the spirit of the invention, so long as such changes fall within the scope of the appended claims.

Having described the invention, what is claimed as new is:

1. In combination with a vehicle body having a top, said top having an opening therein, a collapsible flexible roof adapted to close the opening when in an extended position and render the opening free and unobstructed when the roof is in a collapsed position, a roller upon which the collapsible roof is adapted to be rolled, said collapsible roof comprising a pair of sections, hook members carried by one section, the other section having notches into which said hook members are adapted to extend, spring plunger latches adapted to engage the hooks for holding the sections in assembled relation and also adapted to release the hooks to permit the sections to be separated, and means for moving the collapsible roof to and from an extended position.

2. In combination with a vehicle body having a top, said top having an opening therein, a collapsible flexible roof adapted to close the opening when in an extended position and render the opening free and unobstructed when the roof is in a collapsed position, a roller upon which the collapsible roof is adapted to be rolled, said collapsible roof comprising a pair of sections, hook members carried by one section, the other section having notches into which said hook members are adapted to extend, spring plunger latches adapted to engage the hooks for holding the sections in assembled relation and also adapted to release the hooks to permit the sections to be separated, means for moving the collapsible roof to and from an extended position, and said last mentioned means comprising a power driven means, and a selectively operated manually driven means.

3. In combination with a vehicle body having a top, said top having a rear view window, said top also having an opening above the rear view window, a collapsible flexible roof adapted to close the opening when in an extended position and rendering the opening free and unobstructed when the roof is in a collapsed position, said collapsible roof comprising a pair of sections detachably secured together and adapted to move in unison longitudinally of the top, one portion of the roof being adapted to be collapsed at one end of the vehicle body, and means for releasably connecting the sections in a manner whereby one section may remain in a collapsed position within the body and the other section may extend as a closure for the top, the sections being spaced from each other at their adjoining ends adjacent the rear view window of the body.

GEORGE LIEBLER.